US009767016B2

(12) United States Patent
Kurabayashi (10) Patent No.: US 9,767,016 B2
(45) Date of Patent: Sep. 19, 2017

(54) GENERATION OF SEARCH INDEX (71) Applicant: Empire Technology Development LLC, Wilmington, DE (US)

(72) Inventor: Shuichi Kurabayashi, Fujisawa (JP)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 495 days.

(21) Appl. No.: 14/444,365

(22) Filed: Jul. 28, 2014

(65) Prior Publication Data
US 2016/0026665 A1 Jan. 28, 2016

(51) Int. Cl.
*G06F 17/30* (2006.01)
*G06F 12/02* (2006.01)

(52) U.S. Cl.
CPC .... *G06F 12/0246* (2013.01); *G06F 17/30946* (2013.01)

(58) Field of Classification Search
None
See application file for complete search history.

(56) References Cited

U.S. PATENT DOCUMENTS

| | | | |
|---|---|---|---|
| 6,374,253 B1 * | 4/2002 | Weider | G06F 17/30336 |
| 6,490,589 B1 * | 12/2002 | Weider | H04L 29/12132 |
| 8,285,918 B2 | 10/2012 | Maheshwari | |
| 2006/0149712 A1 * | 7/2006 | Kindsvogel | G06F 17/30312 |
| 2009/0228714 A1 * | 9/2009 | Fiske | G06F 21/32 |
| | | | 713/186 |
| 2011/0219008 A1 * | 9/2011 | Been | G06F 17/30 |
| | | | 707/742 |
| 2012/0271813 A1 | 10/2012 | Shen et al. | |
| 2013/0246711 A1 | 9/2013 | Testardi et al. | |
| 2015/0347443 A1 * | 12/2015 | Reid | G06F 17/30 |
| | | | 707/693 |

OTHER PUBLICATIONS

Matsunaga, S. et al., "MTJ-based nonvolatile logic-in-memory circuit, future prospects and issues," Design, Automation & Test in Europe Conference & Exhibition, Apr. 20-24, 2009, pp. 433-435.
Roh, H. et al., "B+-tree index optimization by exploiting internal parallelism of flash-based solid state drives," Proceedings of the VLDB Endowment, vol. 5, No. 4, pp. 286-297 (2011).
Anand, A. et al., "Design Patterns for Tunable and Efficient SSD-based Indexes," University of Wisconsin-Madison Department of Computer Sciences, pp. 12 (2013).

(Continued)

*Primary Examiner* — Bai D. Vu
(74) *Attorney, Agent, or Firm* — Brundidge & Stanger, P.C.

(57) ABSTRACT

Technologies are generally described for generating search indices. In some examples, a method performed under control of a storage device including a first memory and a second memory may include generating a first search index that corresponds to a first data stored in the first memory, based on analysis of the first data; and generating a second search index that corresponds to a second data stored in the second memory in parallel with the generating of the first search index, based on analysis of the second data.

21 Claims, 5 Drawing Sheets

(56) References Cited

OTHER PUBLICATIONS

Kissinger, T. et al., "A High-Throughput In-Memory Index, Durable on Flash-based SSD," SIGMOD Record, vol. 41, No. 3, pp. 44-50 (2012).

De, A. et al., "Minerva: Accelerating Data Analysis in Next-Generation SSDs," Proceedings of the 2013 IEEE 21st Annual International Symposium on Field-Programmable Custom Computing Machines, pp. 9-16 (2013).

* cited by examiner

GENERATION OF SEARCH INDEX

BACKGROUND

A solid-state drive (SSD) (also known as a solid-state disk or electronic disk) is a data storage device using integrated circuit assemblies as memory to store data persistently. The SSD may differ from conventional hard disk drives (HDDs) in several ways. For example, the SSD has semiconductor properties and have no moving parts. SSD technology may use electronic interfaces compatible with traditional block input/output (I/O) HDDs, thus, permitting simple replacement in common applications.

SUMMARY

In an example, a method performed under control of a storage device including a first memory and a second memory may include generating a first search index that corresponds to a first data stored in the first memory, based on analysis of the first data; and generating a second search index that corresponds to a second data stored in the second memory in parallel with the generating of the first search index, based on analysis of the second data.

In another example, a storage device may include a first memory configured to store first data; a second memory configured to store second data; a first index generator configured to: analyze the first data, and generate a first search index that corresponds to the first data, based on the analysis of the first data; a second index generator configured to: analyze the second data, and generate a second search index that corresponds to the second data, based on the analysis of the second data; and an index memory configured to store the first search index and the second search index.

In yet another example, a computer-readable storage medium having stored thereon computer-executable instructions that, in response to execution, may cause a storage device including a first memory and a second memory to perform operations including: analyzing first data stored in the first memory; analyzing second data stored in the second memory; generating a first search index that corresponds to the first data, based on the analysis of the first data; generating a second search index that corresponds to the second data in parallel with the generating of the first search index, based on the analysis of the second data; and writing the generated first search index and second search index in a third memory different from the first memory and the second memory.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatuses, systems, devices, and computer program products related to a search index generating scheme. Technologies are generally described for a method for analyzing first data stored in a first memory and analyzing second data stored in a second memory. For example, a type of the first data and second data may be obtained by the analysis. The type of the first data and second data may include at least one of a word type, an image type, a video type or an audio type.

The method may further include generating a first search index corresponding to the first data and a second search index corresponding to the second data. Especially, the first search index may be generated in parallel with the second search index being generated. The first search index and second search index may be generated according to the type of the first data and second data. For example, if the type of the first data is a word type, the first search index may include a frequency of occurrence of the first data (e.g., a word). Further, if the type of the second data may be an image type, the first search index may include histogram representing a ratio of occurrence of a hundred representative colors in the second data (e.g., an image).

In some embodiments, multiple search indices, each of which corresponds to data, may be generated, simultaneously, with the greatest degree of parallelism that is equal to the number of memories each of which stores the data. Thus, it is possible to improve a speed of assigning search indices to data which may be accumulated in solid-state drive (SSD) storage on a cloud, and to minimize a lead time before the accumulated data becomes searchable.

Figure 1:
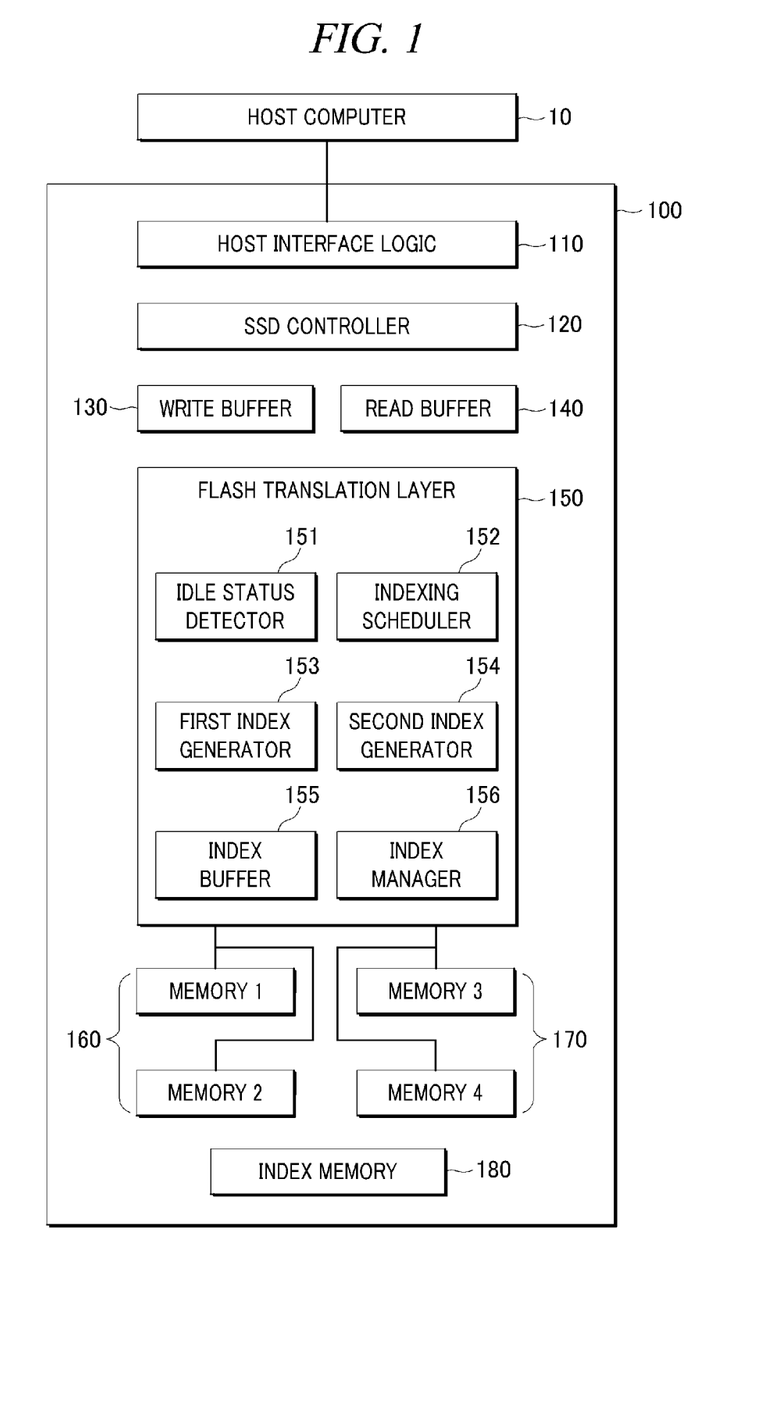
FIG. 1 shows a schematic block diagram illustrating an example architecture for a storage device, arranged in accordance with at least some embodiments described herein.

FIG. 1 shows a schematic block diagram illustrating an example architecture for a storage device 100, arranged in accordance with at least some embodiments described herein. In some embodiments, storage device 100 may be a flash-based solid state drive (SSD) on a cloud layer. Storage device 100 may be communicatively coupled to host computer 10. For example, storage device 100 may be installed in host computer 10. For another example, storage device 100 may be coupled to host computer 10 that may exist separately from storage device 100 via a network.

The network may include, as non-limiting examples, wireless networks such as a mobile radio communication network, including at least one of a 3rd generation (3G) mobile telecommunications network, a 4th or 5th generation mobile telecommunications network, various other mobile telecommunications networks, a satellite network, WiBro (Wireless Broadband Internet), Mobile WiMAX, HSDPA (High Speed Downlink Packet Access), Bluetooth, Bluetooth Low Energy (BLE) network, or the like.

As non-limiting examples, host computer 10 may include a notebook computer, a personal computer, a smart phone, a smart television, a digital camera, a tablet computer, a phablet device, or a personal communication terminal, such as PCS (Personal Communication System), GSM (Global System for Mobile communications), PDC (Personal Digital Cellular), PDA (Personal Digital Assistant), IMT (International Mobile Telecommunication)-2000, CDMA (Code Division Multiple Access)-2000, W-CDMA (W-Code Division Multiple Access) and Wibro (Wireless Broadband Internet) terminal.

As depicted in FIG. 1, storage device 100 may include a host interface logic 110, an SSD controller 120, a write buffer 130, a read buffer 140, a flash translation layer 150, a first memory group 160, a second memory group 170 and an index memory 180. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof.

Host interface logic 110 may be configured to perform and/or execute several operations or processes that may correspond to and keep up with an interface or an application which is compatible with host computer 10. As non-limiting examples, the interface or application may include Serial ATA (SATA) Express or Peripheral Component Interconnect Express (PCI Express).

SSD controller 120 may be configured to control operations or processes for writing data in a memory and/or reading data from a memory. SSD controller 120 may be configured to generate instructions to write and read data in response to a request for writing and reading which may be transmitted via host interface logic 110.

Further, SSD controller 120 may include a central processing unit (CPU) and a random access memory (RAM). Further, SSD controller 120 may be configured to control operations of write buffer 130 to write data and operations of read buffer 140 to read data. SSD controller 120 may be further configured to schedule and control transmission of instructions or signals between flash translation layer 150.

Write buffer 130 may be configured to store data which is transmitted from host interface logic 110 temporarily. Operations of write buffer 130 may be controlled by SSD controller 120.

Read buffer 140 may be configured to store data which are read from first memory group 160 or second memory group 170 temporarily. Operations of read buffer 140 may be controlled by SSD controller 120.

Flash translation layer 150 may include an idle status detector 151, an indexing scheduler 152, a first index generator 153, a second index generator 154, an index buffer 155 and an index manager 156.

Idle status detector 151 may be configured to monitor a scheduling status of writing and/or reading instructions to first memory group 160 and second memory group 170. Further, idle status detector 151 may be configured to monitor and/or determine whether at least one of first memory group 160 or second memory group 170 is in an idle state. As referenced herein, the idle state may refer to a state in which any one of writing and reading is not executed at first memory group 160 and second memory group 170. Idle status detector 151 may be configured to determine the idle state, based on the monitoring result of the scheduling status of writing and/or reading instructions. For example, idle status detector 151 may be configured to determine that first memory group 160 and second memory group 170 are in the idle state, if a NAND R/W module (not illustrated in FIG. 1) that may be configured to write/read data in/from first memory group 160 and second memory group 170 does not perform any operations or processes with regard to first memory group 160 and second memory group 170.

Indexing scheduler 152 may be configured to determine an order of generation of a first search index that may correspond to first data and a second search index that may correspond to second data, based on an order that first memory group 160 storing the first data and second memory group 170 storing the second data are in the idle state.

Indexing scheduler 152 may be further configured to receive a file name of the first data, a file name of the second data, a memory block identifier of the first data, and a memory block identifier of the second data. The memory block identifier may indicate where the first data or the second data is stored and positioned within first memory group 160 or second memory group 170. In some embodiments, indexing scheduler 152 may be configured to receive the file names and memory block identifiers from an operating system (OS) on host computer 10 via application programming interface (API) for a file system that is executed on as a part of the OS on host computer 10 (not illustrated in FIG. 1).

In some embodiments, indexing scheduler 152 may be further configured to add at least one of the file name of the first data, the file name of the second data, the memory block identifier of the first data, or the memory block identifier of the second data into a First-In-First-Out (FIFO) queue, based on the order that first memory group 160 and second memory group 170 are in the idle state. Further, indexing scheduler 152 may be configured to determine the order of the generation of the first search index and the second search index, based on the FIFO queue. By using a FIFO queue, a search index corresponding to data stored in a memory which enters in an idle state earlier may be generated earlier.

First index generator 153 may be configured to analyze the first data which is stored in first memory group 160. In some embodiments, first index generator 153 may be configured to analyze the first data based on at least one of the file name of the first data or the memory block identifier of the first data. First index generator 153 may be further configured to obtain a type of the first data, upon analyzing the first data. For example, but not as a limitation, the type of the first data may include at least one of a word type, an image type, a video type or an audio type.

First index generator 153 may be configured to generate a first search index that corresponds to the first data, based on the analysis of the first data. In some embodiments, first index generator 153 may be configured to generate the first search index based on the type of the first data. For example, but not as a limitation, first index generator 153 may be configured to calculate a frequency of occurrence of words or a frequency of occurrence of n-grams (e.g., combinations of multiple characters), if the type of the first data includes a word type. Further, first index generator 153 may be configured to use the calculated frequency of occurrence of the first data (e.g., a word) as the first search index of the first data.

For another example, if the type of the first data is an image type, first index generator 153 may be configured to calculate a frequency of occurrence of colors in the first data (e.g., an image) based on a number of pixels. Alternatively, first index generator 153 may be configured to produce histograms representing a ratio of occurrence of representative colors in the first data or to produce a results of recognition of characters in the first data. Further, first index generator 153 may be configured to use at least one of the frequency of occurrence of colors, the histograms or the results of character recognition as the first search index of the first data. For another example, first index generator 153 may be configured to generate the first search index of the first data by using multiple feature points of facial images. Further, if the type of the first data is a video type, first index generator 153 may be configured to produce metadata indicating feature points of facial images displayed in the first data (e.g., video), and to generate the first search index of the first data based on the produced metadata. For another example, if the type of the first data is an audio type, first index generator 153 may be configured to generate the first search index of the first data based on vectors, such as Mel Frequency Cepstral Coefficient (MFCC), that indicates a voice signal or an audio signal.

Second index generator 154 may be configured to analyze the second data which is stored in second memory group 170. In some embodiments, second index generator 154 may be configured to analyze the second data based on at least one of the file name of the second data or the memory block identifier of the second data. Second index generator 154 may be further configured to obtain a type of the second data, upon analyzing the second data. For example, but not as a limitation, the type of the second data may include at least one of a word type, an image type, a video type or an audio type.

Second index generator 154 may be configured to generate a second search index that corresponds to the second data, based on the analysis of the second data. In some embodiments, second index generator 154 may be configured to generate the second search index based on the type of the second data. For example, but not as a limitation, second index generator 154 may be configured to calculate a frequency of occurrence of words or a frequency of occurrence of n-grams (e.g., combinations of multiple characters), if the type of the second data includes a word type. Further, second index generator 154 may be configured to use the calculated frequency of occurrence of the second data (e.g., a word) as the second search index of the second data.

For another example, if the type of the second data is an image type, second index generator 154 may be configured to calculate a frequency of occurrence of colors in the second data (e.g., an image) based on a number of pixels. Alternatively, second index generator 154 may be configured to produce histograms representing a ratio of occurrence of representative colors in the second data or to produce a results of recognition of characters in the second data. Further, second index generator 154 may be configured to use at least one of the frequency of occurrence of colors, the histograms or the results of character recognition as the second search index of the second data. For another example, second index generator 154 may be configured to generate the second search index of the second data by using multiple feature points of facial images. Further, if the type of the second data is a video type, second index generator 154 may be configured to produce metadata indicating feature points of facial images displayed in the second data (e.g., video), and to generate the second search index of the second data based on the produced metadata. For another example, if the type of the second data is an audio type, second index generator 154 may be configured to generate the second search index of the second data based on vectors, such as Mel Frequency Cepstral Coefficient (MFCC), that indicates a voice signal or an audio signal.

Second index generator 154 may be configured to generate the second search index in parallel with the generation of the first search index by first index generator 153. First index generator 153 and second index generator 154 may generate the first search index and the second search index, based on the order of generation, which is determined by indexing scheduler 152. In some embodiments, a period for which first index generator 153 generates the first search index may partially overlap a period for which second index generator 154 generates the second search index. In some other embodiments, first index generator 153 may be configured to generate the first search index at the same time second index generate 154 generates the second search index.

Index buffer 155 may be configured to temporarily store the first search index and the second search index, prior to storing of the first search index and the second search index in index memory 180. Since the first search index and the second search index may be generated simultaneously or partially simultaneously, index buffer 155 may be configured to control an order of storing the first search index and the second search index in index memory 180.

Index manager 156 may be configured to accept write/read processing requests. Index manager 156 may be further configured to write the first search index and the second search index into index memory 180. Further, index manager 156 may be configured to read the first search index and the second search index from index memory 180.

First memory group 160 may be configured to store the first data. First memory group 160 may include at least one memory. For example, as depicted in FIG. 1, first memory group 160 may include two memories (e.g., memory 1 and memory 2). In some embodiments, first memory group 160 may include a non-volatile memory. For example, but not as a limitation, the non-volatile memory may include at least one of flash memory which may be based on an electrically erasable programmable read-only memory (EEPROM) technology, such as NAND flash memory or NOR flash memory, phase change memory (PCM), nitride read-only memory (NROM), ferroelectric random access memory (FRAM), or magnetoresistive RAM (MRAM).

Second memory group 170 may be configured to store the second data. Second memory group 170 may include at least one memory. For example, as depicted in FIG. 1, second memory group 170 may include two memories (e.g., memory 3 and memory 4). In some embodiments, second memory group 170 may include a non-volatile memory. For example, but not as a limitation, the non-volatile memory may include at least one of flash memory which may be based on an electrically erasable programmable read-only memory (EEPROM) technology, such as NAND flash memory or NOR flash memory, phase change memory (PCM), nitride read-only memory (NROM), ferroelectric random access memory (FRAM), or magnetoresistive RAM (MRAM).

Index memory 180 may be configured to store the first search index and the second search index. In some embodiments, index memory 180 may be an overprovisioned memory area, which is different from first memory group 160 and second memory group 170, for storing the first search index and the second search index.

Figure 2:
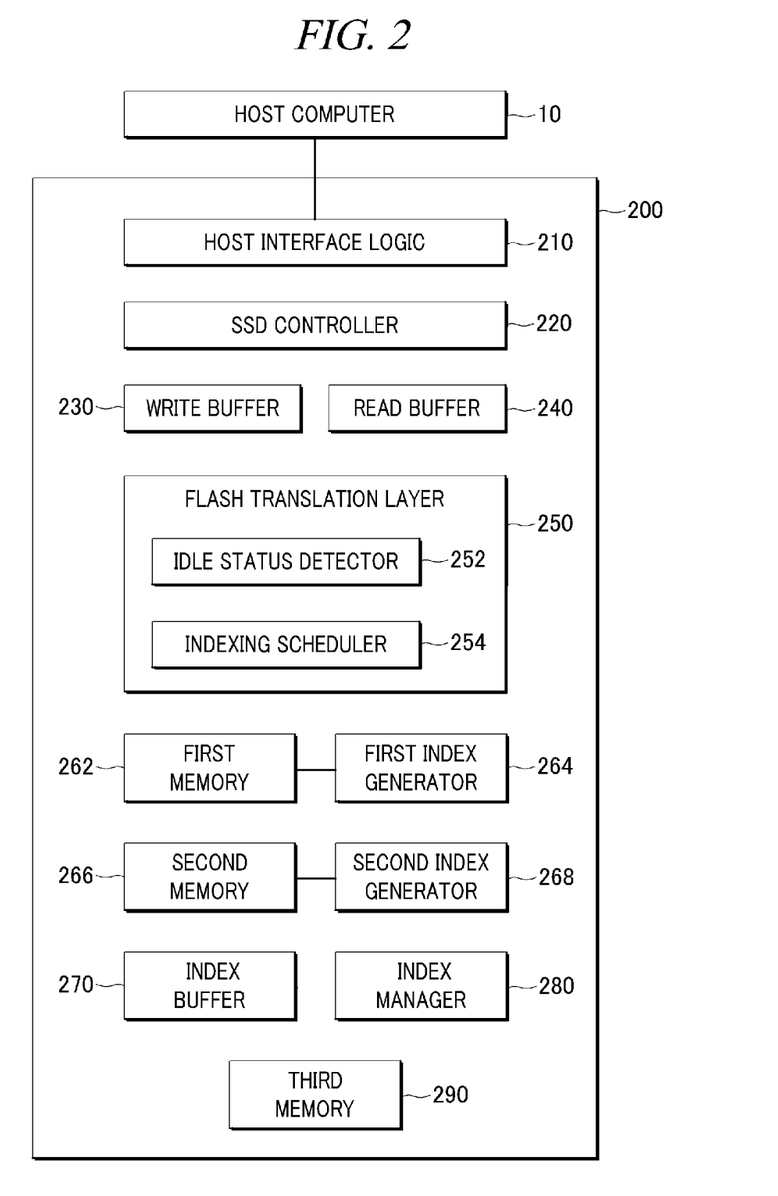
FIG. 2 shows a schematic block diagram illustrating another example architecture for a storage device, arranged in accordance with at least some embodiments described herein.

FIG. 2 shows a schematic block diagram illustrating another example architecture for a storage device 200, arranged in accordance with at least some embodiments described herein. In some embodiments, storage device 200 may be a flash-based solid state drive (SSD) on a cloud layer. Storage device 200 may be communicatively coupled to host computer 10.

As depicted in FIG. 2, storage device 200 may include a host interface logic 210, an SSD controller 220, a write buffer 230, a read buffer 240, a flash translation layer 250, a first memory 262, a first index generator 264, a second memory 266, a second index generator 268, an index buffer 270, an index manager 280 and a third memory 290. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof.

Host interface logic 210 may be configured to perform and/or execute an operation or a process that may correspond to and keep up with an interface or an application which may be compatible with host computer 10.

SSD controller 220 may be configured to control operations or processes for writing data in a memory and/or reading data from a memory. SSD controller 220 may be configured to generate instructions to write and read data in response to a request for writing and reading which may be transmitted via host interface logic 110.

Further, SSD controller 220 may include a central processing unit (CPU) and a random access memory (RAM). Further, SSD controller 220 may be configured to control operations of write buffer 230 to write data and operations of read buffer 240 to read data. SSD controller 220 may be further configured to schedule and control transmission of instructions or signals between flash translation layer 250.

Write buffer 230 may be configured to store data which is transmitted from host interface logic 110 temporarily.

Read buffer 240 may be configured to store data which are read from first memory 262 or second memory 266 temporarily.

Flash translation layer 250 may include an idle status detector 252 and an indexing scheduler 254.

Idle status detector 252 may be configured to monitor a scheduling status of writing and/or reading instructions to first memory 262 and second memory 266. Further, idle status detector 252 may be configured to monitor and/or determine whether at least one of first memory 262 or second memory 266 is in an idle state. Idle status detector 252 may be configured to determine the idle state, based on the monitoring result of the scheduling status of writing and/or reading instructions. For example, idle status detector 252 may be configured to determine that first memory 262 and second memory 266 are in the idle state, if a NAND R/W module (not illustrated in FIG. 2) that may be configured to write/read data in/from first memory 262 and second memory 266 does not perform any operations or processes with regard to first memory 262 and second memory 266.

Indexing scheduler 254 may be configured to determine an order of generation of a first search index that may correspond to first data and a second search index that may correspond to second data, based on an order that first memory 262 storing the first data and second memory 266 storing the second data are in the idle state.

Indexing scheduler 254 may be further configured to receive a file name of the first data, a file name of the second data, a memory block identifier of the first data, and a memory block identifier of the second data. The memory block identifier may indicate where the first data or the second data is stored and positioned within first memory 262 or second memory 266. In some embodiments, indexing scheduler 254 may be configured to receive the file names and memory block identifiers from an operating system (OS) on host computer 10 via application programming interface (API) for a file system that is executed on as a part of the OS on host computer 10 (not illustrated in FIG. 2).

In some embodiments, indexing scheduler 254 may be further configured to add at least one of the file name of the first data, the file name of the second data, the memory block identifier of the first data, or the memory block identifier of the second data into a First-In-First-Out (FIFO) queue, based on the order that first memory 262 and second memory 266 are in the idle state. Further, indexing scheduler 254 may be configured to determine the order of the generation of the first search index and the second search index, based on the FIFO queue.

First memory 262 may be configured to store the first data. In some embodiments, first memory 262 may include a non-volatile memory. For example, but not as a limitation, the non-volatile memory may include at least one of flash memory which may be based on an electrically erasable programmable read-only memory (EEPROM) technology, such as NAND flash memory or NOR flash memory, phase change memory (PCM), nitride read-only memory (NROM), ferroelectric random access memory (FRAM), or magnetoresistive RAM (MRAM).

First index generator 264 may be configured to analyze the first data which is stored in first memory 262. In some embodiments, first index generator 264 may be configured to analyze the first data based on at least one of the file name of the first data or the memory block identifier of the first data. First index generator 264 may be further configured to obtain a type of the first data, upon analyzing the first data. For example, but not as a limitation, the type of the first data may include at least one of a word type, an image type, a video type or an audio type.

First index generator 264 may be configured to generate a first search index that corresponds to the first data, based on the analysis of the first data. In some embodiments, first index generator 264 may be configured to generate the first search index based on the type of the first data. For example, but not as a limitation, first index generator 264 may be configured to calculate a frequency of occurrence of words or a frequency of occurrence of n-grams (e.g., combinations of multiple characters), if the type of the first data includes a word type. Further, first index generator 264 may be configured to use the calculated frequency of occurrence of the first data (e.g., a word) as the first search index of the first data.

For another example, if the type of the first data is an image type, first index generator 264 may be configured to calculate a frequency of occurrence of colors in the first data (e.g., an image) based on a number of pixels. Alternatively, first index generator 264 may be configured to produce histograms representing a ratio of occurrence of representative colors in the first data or to produce a results of recognition of characters in the first data. Further, first index generator 264 may be configured to use at least one of the frequency of occurrence of colors, the histograms or the results of character recognition as the first search index of the first data. For another example, first index generator 264 may be configured to generate the first search index of the first data by using multiple feature points of facial images. Further, if the type of the first data is a video type, first index generator 264 may be configured to produce metadata indicating feature points of facial images displayed in the first data (e.g., video), and to generate the first search index of the first data based on the produced metadata. For another example, if the type of the first data is an audio type, first index generator 264 may be configured to generate the first search index of the first data based on vectors, such as Mel Frequency Cepstral Coefficient (MFCC), that indicates a voice signal or an audio signal.

Second memory 266 may be configured to store the second data. In some embodiments, second memory 266 may include a non-volatile memory. For example, but not as a limitation, the non-volatile memory may include at least one of flash memory which may be based on an electrically erasable programmable read-only memory (EEPROM) technology, such as NAND flash memory or NOR flash memory, phase change memory (PCM), nitride read-only memory (NROM), ferroelectric random access memory (FRAM), or magnetoresistive RAM (MRAM).

Second index generator 268 may be configured to analyze the second data which is stored in second memory 266. In some embodiments, second index generator 268 may be configured to analyze the second data based on at least one of the file name of the second data or the memory block identifier of the second data. Second index generator 268 may be further configured to obtain a type of the second data, upon analyzing the second data. For example, but not as a limitation, the type of the second data may include at least one of a word type, an image type, a video type or an audio type.

Second index generator 268 may be configured to generate a second search index that corresponds to the second data, based on the analysis of the second data. In some embodiments, second index generator 268 may be configured to generate the second search index based on the type of the second data. For example, but not as a limitation, second index generator 268 may be configured to calculate a frequency of occurrence of words or a frequency of occurrence of n-grams (e.g., combinations of multiple characters), if the type of the second data includes a word type. Further, second index generator 268 may be configured to use the calculated frequency of occurrence of the second data (e.g., a word) as the second search index of the second data.

For another example, if the type of the second data is an image type, second index generator 268 may be configured to calculate a frequency of occurrence of colors in the second data (e.g., an image) based on a number of pixels. Alternatively, second index generator 268 may be configured to produce histograms representing a ratio of occurrence of representative colors in the second data or to produce a results of recognition of characters in the second data. Further, second index generator 268 may be configured to use at least one of the frequency of occurrence of colors, the histograms or the results of character recognition as the second search index of the second data. For another example, second index generator 268 may be configured to generate the second search index of the second data by using multiple feature points of facial images. Further, if the type of the second data is a video type, second index generator 268 may be configured to produce metadata indicating feature points of facial images displayed in the second data (e.g., video), and to generate the second search index of the second data based on the produced metadata. For another example, if the type of the second data is an audio type, second index generator 268 may be configured to generate the second search index of the second data based on vectors, such as Mel Frequency Cepstral Coefficient (MFCC), that indicates a voice signal or an audio signal.

Second index generator 268 may be configured to generate the second search index in parallel with the generation of the first search index by first index generator 264. First index generator 264 and second index generator 268 may generate the first search index and the second search index, based on the order of generation, which is determined by indexing scheduler 254. In some embodiments, a period for which first index generator 264 generates the first search index may partially overlap a period for which second index generator 268 generates the second search index. In some other embodiments, first index generator 264 may be configured to generate the first search index at the same time second index generate 268 generates the second search index.

As depicted in FIG. 2, a number of multiple index generating modules (e.g., first index generator 264 and second index generator 268) is equal to a number of multiple memories (e.g., first memory 262 and second memory 266). Thus, multiple search indices each of which correspond to data stored in the multiple memories may be generated by the multiple index generating modules with the greatest degree of parallelism that is equal to the number of memories. Further, the number of sets or combinations of an index generator and a corresponding memory is not limited to two (e.g., a first set of first index generator 264 and first memory 262, and a second set of second index generator 268 and second memory 266). For example, the number of sets or combinations of an index generator and a corresponding memory may be thirty-two, and thus, thirty-two index generating modules may generate multiple search indices corresponding to data stored in the thirty-two memories in parallel.

Index buffer 270 may be configured to temporarily store the first search index and the second search index, prior to storing of the first search index and the second search index in third memory 290. Since the first search index and the second search index may be generated simultaneously or partially simultaneously, index buffer 270 may be configured to control an order of storing the first search index and the second search index in third memory 290.

Index manager 280 may be configured to accept write/read processing requests. Index manager 280 may be further configured to write the first search index and the second search index into third memory 290. Further, index manager 280 may be configured to read the first search index and the second search index from third memory 290.

Third memory 290 may be configured to store the first search index and the second search index. In some embodiments, third memory 290 may be an overprovisioned memory area, which is different from first memory 262 and second memory 266, for storing the first search index and the second search index. For example, but not as a limitation, third memory 290 may include at least one of flash memory which may be based on an electrically erasable programmable read-only memory (EEPROM) technology, such as NAND flash memory or NOR flash memory, phase change memory (PCM), nitride read-only memory (NROM), ferroelectric random access memory (FRAM), or magnetoresistive RAM (MRAM).

Figure 3:
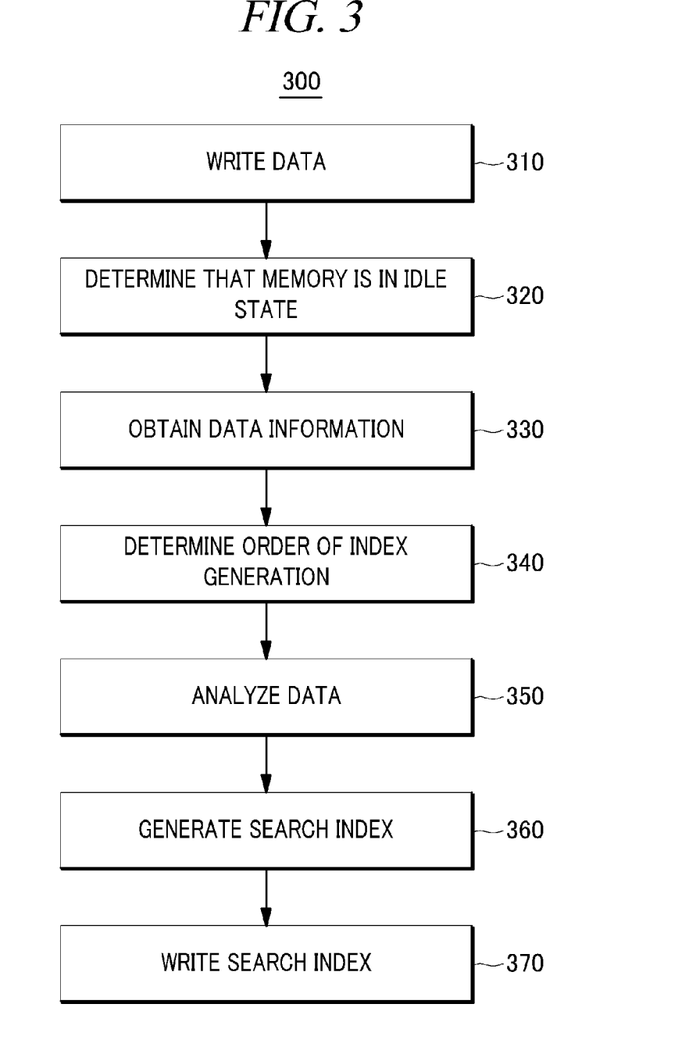
FIG. 3 schematically shows an example flow diagram of a process of a storage device for generating search indices, arranged in accordance with at least some embodiments described herein.

FIG. 3 schematically shows an example flow diagram of a process 300 of a storage device for generating search indices, arranged in accordance with at least some embodiments described herein. The process in FIG. 3 may be implemented by storage device 100, as illustrated in FIG. 1 or by storage device 200, as illustrated in FIG. 2. An example process may include one or more operations, actions, or functions as illustrated by one or more blocks 310, 320, 330, 340, 350, 360 and/or 370. Although illustrated as discrete blocks, various blocks may be divided into additional blocks, combined into fewer blocks, or eliminated, depending on the desired implementation. Processing may begin at block 310.

At block 310 (Write Data), a NAND R/W module corresponding to first memory 262 may store and/or write first data in first memory 262 and another NAND R/W module corresponding to second memory 266 may store and/or write second data in second memory 266. The first data and second data may be received via host interface logic 210. Processing may proceed from block 310 to block 320.

At block 320 (Determine That Memory Is In Idle State), idle status detector 252 may determine whether first memory 262 or second memory 266 are in an idle state. For example, idle status detector 252 may determine that first memory 262 and second memory 266 are in the idle state, if the NAND R/W modules that may be configured to write/read data in/from first memory 262 and second memory 266 do not perform any operations or processes with regard to first memory 262 and second memory 266. Further, at block 320, idle status detector 252 may determine an order that first memory 262 storing the first data and second memory 266 storing the second data are in the idle state. Processing may proceed from block 320 to block 330.

At block 330 (Obtain Data Information), indexing scheduler 254 may obtain data information that may include a file name of the first data, a file name of the second data, a memory block identifier of the first data, and a memory block identifier of the second data. In some embodiments, at block 330, indexing scheduler 254 may receive the file names and memory block identifiers from an operating system (OS) on host computer 10 via application programming interface (API) for a file system that is executed on as a part of the OS on host computer 10. Processing may proceed from block 330 to block 340.

At block 340 (Determine Order of Index Generation), indexing scheduler 254 may determine an order of generation of a first search index that may correspond to the first data and a second search index that may correspond to the second data, based on the order that first memory 262 and second memory 266 are in the idle state, which is determined at block 320.

In some embodiments, at block 340, indexing scheduler 254 may add at least one of the file name of the first data, the file name of the second data, the memory block identifier of the first data, or the memory block identifier of the second data into a First-In-First-Out (FIFO) queue, based on the order that first memory 262 and second memory 266 are in the idle state. Further, at block 340, indexing scheduler 254 may determine the order of the generation of the first search index and the second search index, based on the FIFO queue. Processing may proceed from block 340 to block 350.

At block 350 (Analyze Data), first index generator 264 may analyze the first data which is stored in first memory 262. In some embodiments, first index generator 264 may analyze the first data based on at least one of the file name of the first data or the memory block identifier of the first data, and obtain a type of the first data based on the analysis. For example, but not as a limitation, the type of the first data may include at least one of a word type, an image type, a video type or an audio type. Further, at block 350, second index generator 268 may analyze the second data which is stored in second memory 266. In some embodiments, second index generator 268 may analyze the second data based on at least one of the file name of the second data or the memory block identifier of the second data, and obtain a type of the second data based on the analysis. Processing may proceed from block 350 to block 360.

At block 360 (Generate Search Index), first index generator 264 may generate a first search index that corresponds to the first data, based on the analysis of the first data. In some embodiments, first index generator 264 may generate the first search index based on the type of the first data. Further, at block 360, second index generator 268 may generate a second search index that corresponds to the second data, based on the analysis of the second data. In some embodiments, second index generator 268 may generate the second search index based on the type of the second data. At block 360, second index generator 268 may generate the second search index in parallel with the generation of the first search index by first index generator 264. First index generator 264 and second index generator 268 may generate the first search index and the second search index, based on the order of generation, which is determined at block 340. In some embodiments, a period for which first index generator 264 generates the first search index may partially overlap a period for which second index generator 268 generates the second search index. In some other embodiments, first index generator 264 may generate the first search index at the same time second index generator 268 generates the second search index. Processing may proceed from block 360 to block 370.

At block 370 (Write Search Index), index manager 280 may write the first search index and the second search index into third memory 290. Third memory 290 may be an overprovisioned memory area, which is different from first memory 262 and second memory 266. For example, but not as a limitation, respective one of first memory 262, second memory 266 and third memory 290 may include at least one of flash memory which may be based on an electrically erasable programmable read-only memory (EEPROM) technology, such as NAND flash memory or NOR flash memory, phase change memory (PCM), nitride read-only memory (NROM), ferroelectric random access memory (FRAM), or magnetoresistive RAM (MRAM).

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
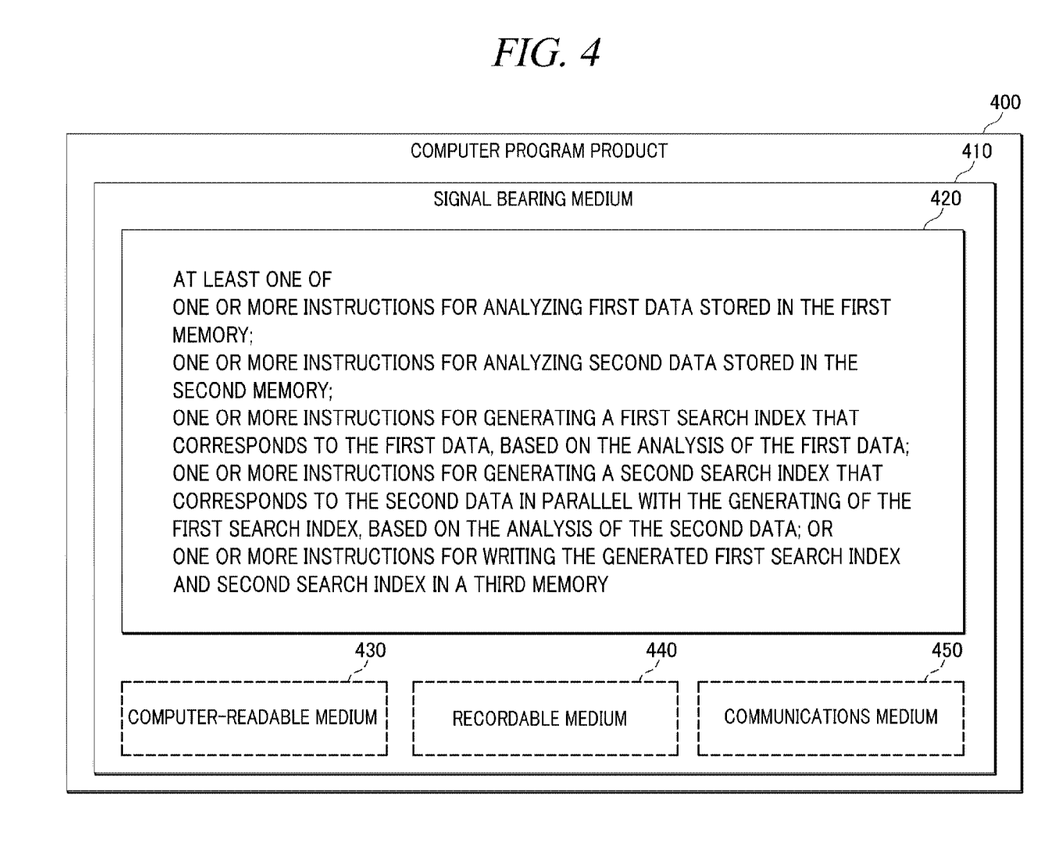
FIG. 4 illustrates computer program products that may be utilized to provide a search index generating scheme, arranged in accordance with at least some embodiments described herein.

FIG. 4 illustrates computer program products that may be utilized to provide a search index generating scheme, arranged in accordance with at least some embodiments described herein. Computer program product 400 may include a signal bearing medium 410. Signal bearing medium 410 may include one or more instructions 420 that, when executed by, for example, a processor, may provide the functionality described above with respect to FIGS. 1-3. By way of example, instructions 420 may include: one or more instructions for analyzing first data stored in the first memory; one or more instructions for analyzing second data stored in the second memory; one or more instructions for generating a first search index that corresponds to the first data, based on the analysis of the first data; one or more instructions for generating a second search index that corresponds to the second data in parallel with the generating of the first search index, based on the analysis of the second data; or one or more instructions for writing the generated first search index and second search index in a third memory different from the first memory and the second memory. Thus, for example, referring to FIG. 1 or FIG. 2, storage device 100 or storage device 200 may undertake one or more of the blocks shown in FIG. 3 in response to instructions 420.

In some implementations, signal bearing medium 410 may encompass a computer-readable medium 430, such as, but not limited to, a HDD, a CD, a DVD, a digital tape, memory, etc. In some implementations, signal bearing medium 410 may encompass a recordable medium 440, such as, but not limited to, memory, read/write (R/W) CDs, R/W DVDs, etc. In some implementations, signal bearing medium 410 may encompass a communications medium 450, such as, but not limited to, a digital and/or an analog communication medium (e.g., a fiber optic cable, a waveguide, a wired communication link, a wireless communication link, etc.). Thus, for example, computer program product 400 may be conveyed to one or more modules of storage device 100 or 200 by an RF signal bearing medium 410, where the signal bearing medium 410 is conveyed by a wireless communications medium 450 (e.g., a wireless communications medium conforming with the IEEE 802.11 standard).

Figure 5:
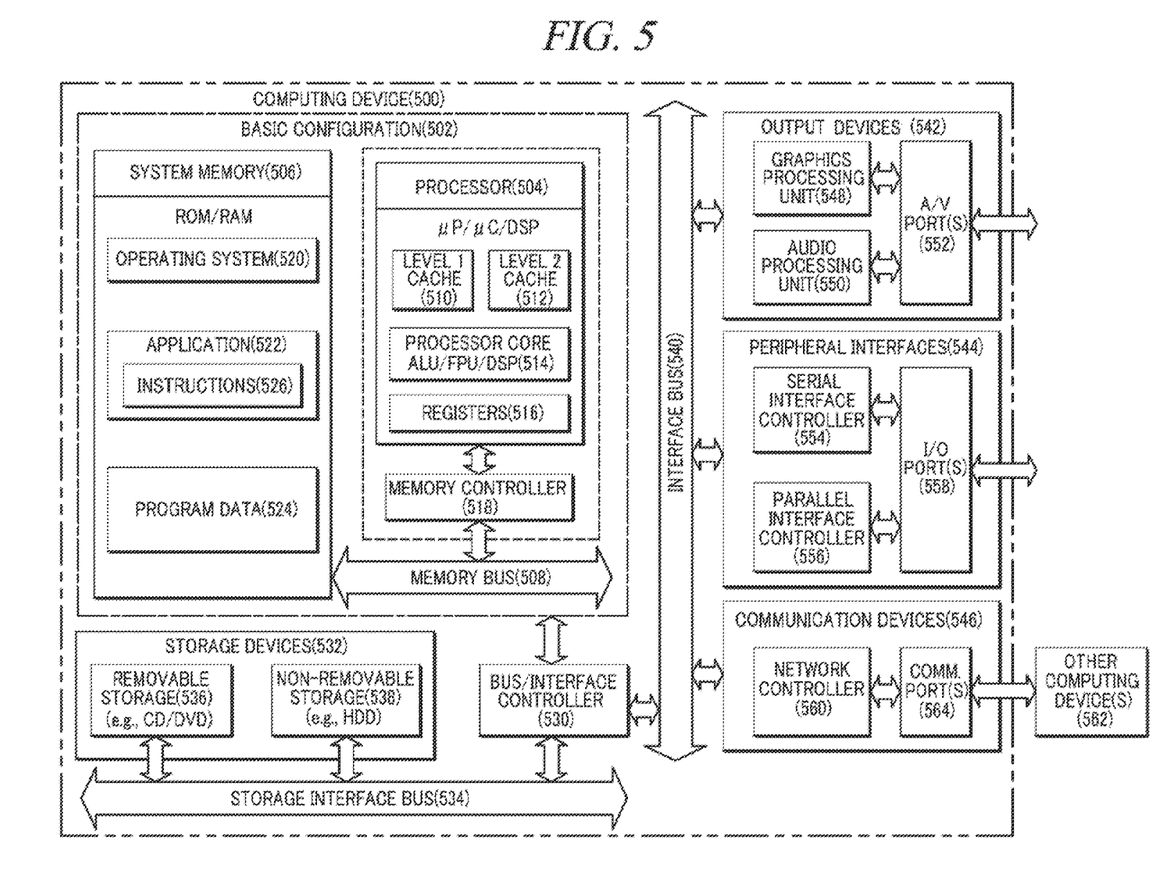
FIG. 5 is a block diagram illustrating an example computing device that may be utilized to provide a search index generating scheme, arranged in accordance with at least some embodiments described herein.

FIG. 5 is a block diagram illustrating an example computing device that may be utilized to provide a search index generating scheme, arranged in accordance with at least some embodiments described herein. In these examples, elements of computing device 500 may be arranged or configured for a device. In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (W), a microcontroller (µC), a digital signal processor (DSP), or any combination thereof. Processor 504 may include one or more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations, memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, an application 522, and program data 524. Application 522 may include instructions 526 that may be arranged to perform the functions as described herein including the actions described with respect to storage device architecture as shown in FIG. 1 or FIG. 2 or including the actions described with respect to the flow charts shown in FIG. 3. In some examples, application 522 may be arranged to operate with program data 524 on an operating system 520 such that the schemes for providing game characters as described herein may be provided.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of a storage device including a first memory and a second memory, the method comprising:

determining whether the first memory and the second memory are in an idle state;

determining an order of generation of a first search index and a second search index, based on another order that the first memory and the second memory are in the idle state;

generating the first search index that corresponds to a first data stored in the first memory, based on analysis of the first data and the determined order of the generation; and generating the second search index that corresponds to a second data stored in the second memory based on analysis of the second data and the determined order of the generation, wherein the generation of the first search index and the second search index based on the order facilitates minimizing a lead time before the first data and the second data becomes searchable using the first search index and the second search index.

2. The method of claim 1, further comprising:
writing the generated first search index and the generated second search index in a third memory different from the first memory and the second memory.

3. The method of claim 1, further comprising:
adding at least one of a file name of the first data, a file name of the second data, a memory block identifier of the first data, or a memory block identifier of the second data into a First-In-First-Out (FIFO) queue, based on the another order that the first memory and the second memory are in the idle state, wherein the determining of the order of the generation of the first search index and the second search index is further based on the FIFO queue.

4. The method of claim 1, further comprising:
receiving a file name of the first data, a file name of the second data, a memory block identifier of the first data, and a memory block identifier of the second data, wherein the analysis of the first data and the second data is based on the file names and the memory block identifiers.

5. The method of claim 1, wherein the analysis of the first data and the second data includes:
obtaining a type of the first data and the second data, and
wherein the generating of the first search index and the second search index is based on the type of the first data and the second data.

6. The method of claim 5, wherein the type of the first data and the second data includes a word type, and
wherein the first search index includes a frequency of occurrence of the first data and the second search index includes a frequency of occurrence of the second data.

7. The method of claim 5, wherein the type of the first data and the second data includes an image type, and
wherein the first search index includes a frequency of occurrence of colors in the first data and the second search index includes a frequency of occurrence of colors in the second data.

8. The method of claim 1, wherein the first memory and the second memory include a NAND flash memory.

9. The method of claim 1, wherein the determining whether the first memory and the second memory are in the idle state comprises determining that both the first memory and the second memory are in the idle state, and wherein the generating of the second search index comprises generating the second search index in parallel with the generation of the first search index.

10. A storage device, comprising:
a first memory configured to store first data;
a second memory configured to store second data;
an idle status detector configured to:
determine whether the first memory and the second memory are in an idle state;
an indexing scheduler configured to:
receive a file name of the first data, a file name of the second data, a memory block identifier of the first data, and a memory block identifier of the second data;
a first index generator configured to:
analyze the first data, wherein the first index generator analyzes the first data based on the file name of the first data and the memory block identifier of the first data, and
generate a first search index that corresponds to the first data, based on the analysis of the first data;
a second index generator configured to:
analyze the second data, wherein the second index generator analyzes the second data based on the file name of the second data and the memory block identifier of the second data, and
generate a second search index that corresponds to the second data, based on the analysis of the second data; and
an index memory configured to store the first search index and the second search index, wherein the generation of the first search index and the second search index is based on an order that the first memory and the second memory are in the idle state, and wherein the generation of the first search index and the second search index based on the order facilitates minimizing a lead time before the first data and the second data becomes searchable using the first search index and the second search index.

11. The storage device of claim 10, wherein the indexing scheduler is further configured to determine another order of the generation of the first search index and the second search index, based on the order that the first memory and the second memory are in the idle state, and
wherein the first index generator and the second index generator generate the first search index and the second search index, based on the determined order.

12. The storage device of claim 10, wherein the indexing scheduler is further configured to add at least one of the file name of the first data, the file name of the second data, the memory block identifier of the first data, or the memory block identifier of the second data into a First-In-First-Out (FIFO) queue, based on the order that the first memory and the second memory are in the idle state,
wherein the indexing scheduler is configured to determine the order of the generation of the first search index and the second search index, based on the FIFO queue.

13. The storage device of claim 10, wherein the first index generator is further configured to obtain a type of the first data and generate the first search index, based on the type of the first data, and
wherein the second index generator is further configured to obtain a type of the second data and generate the second search index, based on the type of the second data.

14. The storage device of claim 13, wherein the type of the first data and the second data includes a word type, and
wherein the first search index includes a frequency of occurrence of the first data and the second search index includes a frequency of occurrence of the second data.

15. The storage device of claim 13, wherein the type of the first data and the second data includes an image type, and wherein the first search index includes a frequency of occurrence of colors in the first data and the second search index includes a frequency of occurrence of colors in the second data.

16. The storage device of claim 10, further comprising:

an index buffer configured to temporarily store the first search index and the second search index, prior to the storing of the first search index and the second search index in the index memory.

17. The storage device of claim 10, wherein the storage device is a flash-based solid state drive (SSD) on a cloud layer.

18. The storage device of claim 10, wherein the first memory and the second memory include a NAND flash memory.

19. The storage device of claim 10, wherein the idle status detector is configured to determine that both the first memory and the second memory are in the idle state, and wherein the second index generator is configured to generate the second search index in parallel with the generation of the first search index by the first index generator.

20. A non-transitory computer-readable storage medium having stored thereon computer-executable instructions that, in response to execution, cause a storage device including a first memory and a second memory to perform operations, comprising:

analyzing first data stored in the first memory; analyzing second data stored in the second memory;

generating a first search index that corresponds to the first data, based on the analysis of the first data;

generating a second search index that corresponds to the second data in parallel with the generation of the first search index, based on the analysis of the second data;

configuring an index buffer to temporarily store the first search index and the second search index, prior to the storing of the first search index and the second search index in a third memory, wherein the index buffer is further configured to control an order of storing the first search index and the second search index in the third memory; and writing the generated first search index and second search index in the third memory different from the first memory and the second memory.

21. The non-transitory computer-readable storage medium of claim 20, wherein generating further comprises generating the second search index in parallel with the generation of the first search index.

* * * * *

UNITED STATES PATENT AND TRADEMARK OFFICE
CERTIFICATE OF CORRECTION

| | |
|---|---|
| PATENT NO. | : 9,767,016 B2 |
| APPLICATION NO. | : 14/444365 |
| DATED | : September 19, 2017 |
| INVENTOR(S) | : Kurabayashi |

It is certified that error appears in the above-identified patent and that said Letters Patent is hereby corrected as shown below:

In the Specification

Column 13, Lines 54-55, delete "microprocessor (W)," and insert -- microprocessor (µP), --, therefor.

Signed and Sealed this
Seventeenth Day of April, 2018

Andrei Iancu
*Director of the United States Patent and Trademark Office*